No. 686,786. Patented Nov. 19, 1901.
C. UPTON.
VARIABLE SPEED GEARING.
(Application filed Jan. 26, 1900. Renewed July 29, 1901.)
(No Model.) 2 Sheets—Sheet 2.
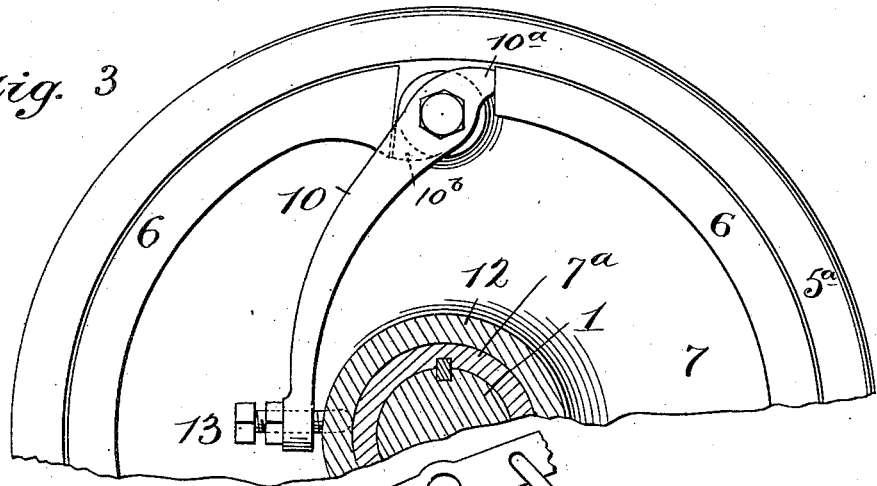
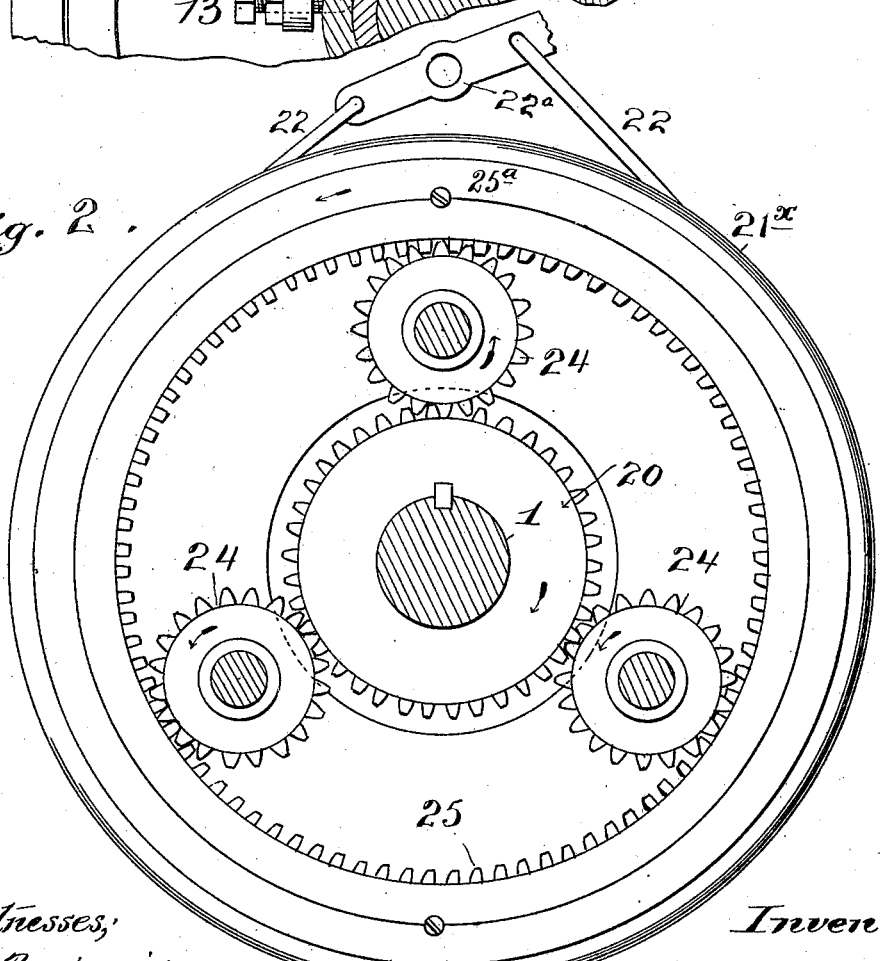

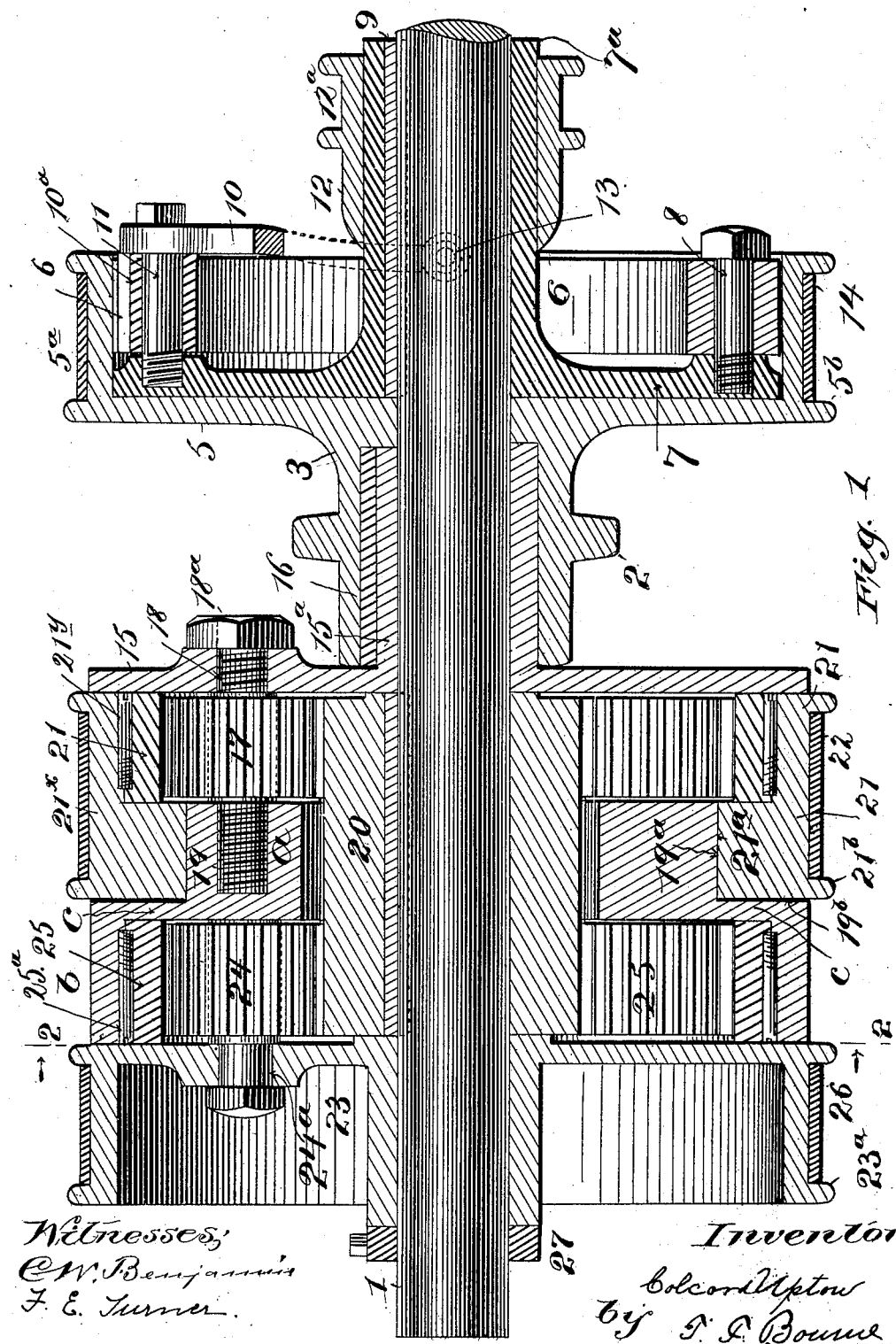

UNITED STATES PATENT OFFICE.

COLCORD UPTON, OF BEVERLY, MASSACHUSETTS, ASSIGNOR TO UPTON MACHINE COMPANY, A CORPORATION OF NEW YORK.

VARIABLE-SPEED GEARING.

SPECIFICATION forming part of Letters Patent No. 686,786, dated November 19, 1901.

Application filed January 26, 1900. Renewed July 29, 1901. Serial No. 70,158. (No model.)

*To all whom it may concern:*

Be it known that I, COLCORD UPTON, a citizen of the United States, residing at Beverly, county of Essex, State of Massachusetts, have invented certain new and useful Improvements in Variable-Speed Gearing, of which the following is a specification.

My invention relates to improvements in gearing adapted to transmit variable speeds from a relatively constant source of power; and in carrying out my invention I provide a driving part, three independently-rotative members, one member being supported loosely by another member to rotate freely therearound, and two sets of power-transmitting mechanisms, each including three elements, an element of two power-transmitting mechanisms being carried by the driving part, an element of two power-transmitting mechanisms being carried by one of the rotative members, and one element of each power-transmitting mechanism being carried by each of the other rotative members.

The invention also consists in the novel details of improvements that will be more fully hereinafter set forth and then pointed out in the claims.

Reference is to be had to the accompanying drawings, forming part hereof, wherein—

Figure 1 is a central longitudinal section of a variable-speed gearing embodying my invention. Fig. 2 is a cross-section on the plane of the line 2 2 in Fig. 1 looking from the left, and Fig. 3 is a partly-sectional detail face view looking from the right in Fig. 1.

In the accompanying drawings, in which similar characters of reference indicate corresponding parts in the several views, 1 indicates a driving part which is shown in the form of a shaft that may be mounted in any suitable bearings (not shown) and which may be rotated from any suitable source of power—such, for instance, as a motor, engine, or the like—and said shaft may be coupled direct to the driving member of such motor or engine or through the medium of any suitable gearing or other connection.

2 is a part to be driven by the driving part 1, and the part 2 may be in the form of a sprocket-wheel, gear, pulley, or other suitable power-transmitting element. The driven part 2 is mounted to rotate freely around the driving part 1, and it is shown provided with a hub or sleeve 3, mounted to rotate freely on the driving part 1. The hub or sleeve 3 projects from a disk or drum 5, which is to be firmly connected with the driving part 1 when it is desired to rotate the driven part 2 at the same speed and in the same direction as part 1. While any suitable means may be provided for connecting the parts 1 and 5 together, I preferably provide friction devices for the purpose. In the drawings I have shown the flange $5^a$ of disk or drum 5 as encircling a split ring 6, shown secured to a support 7, as by a screw 8, which support may be in the form of a disk, arm, or the like. The support or disk 7 is secured to the driving part or shaft 1 and is shown provided with a hub $7^a$, secured to said shaft by a key 9. The split ring 6 is to be expanded into frictional engagement with flange $5^a$, for which purpose I have shown a lever or arm 10, connected with support 7 by a pivot or the like 11, one end $10^a$ of which lever is shown adapted to bear against one arm of the split ring 6, and a projection $10^b$ of lever 10 acts against the other arm of said ring. (See Fig. 3.) The lever or arm 10 extends in line with shaft 1 and is adapted to be operated by a sleeve or the like 12, shown mounted to slide upon hub $7^a$, the lever 10 being shown provided with an adjustable contact-piece 13 to engage the sleeve 12. The sleeve 12 may be reciprocated by any suitable means, and it is shown provided with an annular groove $12^a$ to receive a shifting fork or other operating device. (Not shown.) It will be understood that when sleeve 12 is pushed under lever or arm 10 the driving part 1 will be firmly connected with the driven part 2 through the expansion of the ring 6, and thereby the driven part 2 will be rotated in the same direction and at the same speed as the driving part 1.

It may be desirable in case of emergency to check the rotation of the driven part 2, and for this purpose I have shown the flange $5^a$ provided with an annular groove $5^b$ to receive a brake-band 14, which may be operated by any suitable means to grip said flange. To rotate the driven part 2 at a slower speed than the driving part 1, but in the same direction as the latter, I provide the following arrangement: 15 is a disk or extension mounted to rotate freely upon driving part 1 and rigidly connected with the driven part 2, being shown provided with a hub 15ª, journaled upon shaft 1 and passing within the bore of hub 3 and secured thereto by a key 16, whereby the parts 2, 3, 5, 15ª, and 15 are all rigidly connected together; but this rigid connection of said parts can be accomplished by other means than that shown. The disk or extension 15 carries one or more gears or pinions 17, which are to be mounted upon shafts or studs 18, rigidly secured to disk 15. The shafts or studs 18 are also rigidly connected with an annulus or ring 19, whereby said gears or pinions may lie between the disk 15 and the annulus. (See Fig. 1.) The stud 18 I have shown is provided with a central bearing portion for the gear or pinion 17 and threaded portions at its ends of reduced diameter to form shoulders, whereby the part 18 can be firmly secured to the annulus 19 and can likewise be firmly screwed or clamped to the disk 15, as by a nut 18ª, whereby the parts 15 and 19 are rigidly united. 20 is a gear mounted upon and secured to the driving part or shaft 1 (as by a key) and in mesh with the pinion or pinions 17. 21 is an annular rack or gear device surrounding pinions 17 and in mesh therewith, being shown secured to a ring 21ˣ, that is provided with an annular bearing-surface 21ª, that surrounds a corresponding annular surface or guideway 19ª of annulus 19, whereby the rack 21 is guided in a circular path around the pinions. I have shown rack 21 secured to ring 21ˣ by screws 21ʸ, that enter bores located at the joint between parts 21 and 21ˣ; but these parts may be otherwise secured together or could be made in one piece of material. The rack 21 and ring 21ˣ also lie between the disk 15 and a radially-disposed surface or wall 19ᵇ of the annulus 19, whereby said rack is kept from lateral play. The ring 21ˣ is shown provided with a peripheral groove 21ᵇ to receive a brake-band 22, which may be operated in any suitable manner. In Fig. 2 I have shown a portion of a lever 22ª, the ends of the brake-band 22 being connected with said lever on opposite sides of its pivot, whereby as the lever is swung on its pivot the brake-band can be caused to grip the ring 21ˣ as much as desired. It will be understood that when the rack 21 is held from rotation and the driving-part 1 rotates the gear 20 will rotate the pinion or pinions 17, and as the latter mesh with the rack 21 they will be caused to travel bodily around said rack, thereby carrying around with them or rotating the disk 15 and the driven part 2 at a speed slower than the rotation of shaft 1, but in the direction of rotation of the latter. As the friction devices at this time are not to be set in engagement with disk or drum 5, the latter will be free to rotate.

To rotate the driven part 2 in a direction reverse to the direction of rotation of driving part 1, I provide a drum or the like 23, mounted to rotate freely upon driving part or shaft 1, and this part 23 carries one or more gears or pinions 24, that mesh with gear 20 (or with a separate gear secured to said shaft) and also with an annular rack 25, carried by the annulus 19. I have shown rack 25 secured to annulus or ring 19 by screws 25ª, that enter bores located at the joint between parts 19 and 25; but these parts may be otherwise secured or could be made in one piece of material. It will be seen that the gears or pinions 24 are located in the space between the face of drum 23 and the adjacent surface of annulus 19 within the circle of rack 25, whereby said gears are kept in mesh with gear 20 and rack 25. The studs 24ª, carried by drum 23, support the gears or pinions 24, so that they can rotate freely. It is intended that the drum 23 shall be held from rotation to cause the gears 24 and rack 25 to operate the driven part 2, and for this purpose I have shown a brake-band 26, located in a peripheral groove 23ª in drum 23, which brake-band may be operated in any suitable manner, as by a lever, as likewise may the brake-band 14.

In the illustration shown the annulus 19 has an inner portion a, to which the studs 18 are connected and around which the rack 21 can travel, and an outer portion b, having the rack 25 offset from the plane of the portion a, these two portions of the annulus being connected by an intermediate web c; but this particular arrangement is because of the relative diameters of the parts, and it will be evident that if the diameters of the gears and racks are changed the particular arrangement of the annulus 19 may be altered. When it is desired to rotate the driven part 2 reversely to the direction of rotation of the driving part 1, the drum 23 is held from rotation, and thereupon gear 20 will rotate the gears or pinions 24 on their axes, and they in turn will cause rack 25 to travel around shaft 1, as indicated by the arrows in Fig. 2, whereupon the annulus 19 will cause disk 15 and part 2 to rotate in the same direction. The drum 23 can be kept from sliding on shaft 1 by a collar or the like 27.

The operation of the parts may be summarized as follows: When it is desired to rotate the driven part 2 at the same speed as the driving part 1, the latter is rigidly connected with drum 5, as by the friction devices, as before explained, and as the disk 15 is rigidly connected to drum 5 the parts 15, 17, 19, 20, 24, 25, and 23 will all be locked together, so as not to have independent rotation, and will thereby all rotate at the same speed as shaft 1 and in the same direction, and the rack 21 will be carried around with pinions 17, because the latter do not at this time rotate on their axes. To rotate the driven part 2 in the same direction as the driving part 1, but at a slower speed than the latter, the friction devices are not set, but the brake 22 is caused to grip the ring 21ˣ to keep the latter from rotating more or less, and thereupon the driven part 2 will be rotated, as before explained. Drum 5 and annulus 19 will also rotate around said shaft, and as rack 25 also rotates around pinions 24 it will cause them to rotate on their axes, and as they are in mesh with gear 20 a differential motion will occur; but as drum 23 is free to rotate on shaft 1 there will be no interference between the parts 20, 24, and 25. When the brake is applied to drum 23 to keep it from rotating, the gear 20 will cause pinions 24 to transmit motion to the driven part 2 in a direction reverse to the direction of rotation of part 1, as before explained, and the rotation of pinions 17 will cause rack 21 to rotate without interference, drum 5 likewise being capable of free rotation around shaft 1, as the friction devices are not now set. If the emergency-brake 14 is set, drum 5, disk 15, and ring 19 will be limited in their rotation, pinions 17 will be rotated on their axes by gear 20 and will rotate rack 21 freely, and pinions 24 will also rotate on their axes, and as they are in mesh with rack 25 the drum 23 will be caused to rotate around shaft 1 freely. Thus it will be seen that if either brake or if the friction devices are set there is no interference in any part of the gearing and the parts all coact freely without danger of breakage.

I do not limit my invention to the details of construction shown and described, as they may be varied without departing from the spirit thereof.

Having now described my invention, what I claim is—

1. The combination of a driving part, a rotative member having a guideway, a rack guided to rotate thereon, a driven part rigidly connected with said member, a pinion carried by said rotative member in mesh with said rack, means to limit rotation of said rack, means carried by the driving part to rotate said pinion, and means independent of the gearing to firmly connect the driving and driven parts together, substantially as described.

2. The combination of a driving part, a rotative member having a guideway, a rack guided to rotate therearound, a pinion carried by said rotative member in mesh with said rack, means to limit rotation of said rack, means carried by the driving part to rotate said pinion, and means for firmly connecting the driving part to said rotative member, substantially as described.

3. The combination of a driving part, a rotative member, an annulus or ring carried thereby, a rack guided to rotate around said ring, means to limit rotation of said rack, a pinion in mesh with said rack, means carried by the driving part in mesh with said pinion, and means for firmly connecting the driving part to said rotative member, substantially as described.

4. The combination of a driving part, a rotative member, an annulus or ring carried thereby, a rack carried by said annulus or ring, a rack guided to rotate around the annulus or ring, means for limiting rotation of said rack, a pinion in mesh with the last-mentioned rack and carried by the rotative member, a pinion in mesh with the first-mentioned rack, a rotative element carrying said pinion, means for limiting rotation of said rotative element, and means carried by the driving part for operating said pinions, substantially as described.

5. The combination of a driving part, a rotative member, an annulus or ring carried thereby, a rack carried by said annulus or ring, a rack guided to rotate around the annulus or ring, a pinion in mesh with the last-mentioned rack and carried by the rotative member, a pinion in mesh with the first-mentioned rack, a rotative element carrying said pinion, means carried by the driving part for operating said pinions, means for limiting the rotation of the loose rack, means for limiting the rotation of the rotative element, and means for firmly uniting the driving part to said rotative members, substantially as described.

6. The combination of a driving part, a rotative member, an annulus carried thereby and having an annular guideway and a radial bearing-surface, a loose rack guided to rotate around the annulus, a pinion carried by the rotative member in mesh with said rack, a rack carried by the rotative member, a pinion in mesh therewith, a rotative element carrying said pinion, means carried by the driving part for rotating said pinions, means for limiting the rotation of the loose rack, and means for limiting the rotation of the rotative element, substantially as described.

7. The combination of a driving part, a disk mounted to rotate thereon, studs carried by said disk, an annulus or ring connected with said studs, a pinion journaled between the annulus or ring and the disk, a rack guided to rotate around the annulus and in mesh with the pinion, means carried by the driving part to rotate said pinion, and means for limiting the rotation of said rack, substantially as described.

8. The combination of a driving part, a drum loose thereon, means for connecting the drum firmly to the driving part, a disk connected with said drum, a pinion and an annulus or ring connected with said disk, a rack guided to rotate around said annulus or ring and in mesh with said pinion, means carried by the driving part to rotate said pinion, means to limit the rotation of said rack, and a driven part connected with the drum, substantially as described.

COLCORD UPTON.

Witnesses:
F. E. TURNER,
T. F. BOURNE.